(12) United States Patent
Bultman

(10) Patent No.: US 8,224,382 B2
(45) Date of Patent: *Jul. 17, 2012

(54) WIRELESS COMMUNICATIONS INTERFACE

(75) Inventor: Michael J. Bultman, Jacksonville, FL (US)

(73) Assignee: ParkerVision, Inc., Jacksonville, FL (US)

( * ) Notice: Subject to any disclaimer, the term of this patent is extended or adjusted under 35 U.S.C. 154(b) by 642 days.

This patent is subject to a terminal disclaimer.

(21) Appl. No.: 12/289,584

(22) Filed: Oct. 30, 2008

(65) Prior Publication Data

US 2009/0061931 A1 Mar. 5, 2009

Related U.S. Application Data

(63) Continuation of application No. 10/944,907, filed on Sep. 21, 2004, now Pat. No. 7,454,230, which is a continuation of application No. 09/440,262, filed on Nov. 15, 1999, now Pat. No. 6,804,536.

(60) Provisional application No. 60/140,679, filed on Jun. 24, 1999.

(51) Int. Cl.
    *H04B 1/38* (2006.01)
(52) U.S. Cl. .................... 455/557; 455/554.2; 455/41.2; 455/465
(58) Field of Classification Search .................. 455/557, 455/465, 552.1, 554.2, 445, 462, 555, 556.1, 455/556.2, 41.2, 41.3, 554.1, 558, 559, 426.1
See application file for complete search history.

(56) References Cited

U.S. PATENT DOCUMENTS

| 4,011,410 | A |   | 3/1977  | Thomas          |           |
|-----------|---|---|---------|-----------------|-----------|
| 4,291,197 | A |   | 9/1981  | Yonaga          |           |
| 4,538,028 | A |   | 8/1985  | Gazzoli et al.  |           |
| 4,658,096 | A |   | 4/1987  | West et al.     |           |
| 5,048,073 | A |   | 9/1991  | Weiser et al.   |           |
| 5,353,331 | A |   | 10/1994 | Emery et al.    |           |
| 5,469,496 | A |   | 11/1995 | Emery et al.    |           |
| 5,526,403 | A | * | 6/1996  | Tam             | 455/426.1 |
| 5,533,027 | A |   | 7/1996  | Akerberg et al. |           |
| 5,555,448 | A |   | 9/1996  | Thiede et al.   |           |
| 5,610,972 | A |   | 3/1997  | Emery et al.    |           |
| 5,664,005 | A |   | 9/1997  | Emery et al.    |           |
| 5,673,308 | A |   | 9/1997  | Akhavan         |           |
| 5,812,637 | A |   | 9/1998  | Schornack et al.|           |
| 5,901,359 | A |   | 5/1999  | Malmstrom       |           |
| 5,903,835 | A |   | 5/1999  | Dent            |           |

(Continued)

FOREIGN PATENT DOCUMENTS

EP  0843491 A2  5/1998

(Continued)

*Primary Examiner* — John J Lee
(74) *Attorney, Agent, or Firm* — Sterne, Kessler, Goldstein & Fox P.L.L.C.

(57) ABSTRACT

A wireless communications interface couples wireless service to conventional wireline phone appliances. In one embodiment, the wireless communications interface is connected to the phone appliances through existing phone jacks. This allows a user to place and receive calls over a wireless network using the existing wireline infrastructure in a building. By using the invention, users can consolidate their portable and fixed phone service with one of the multiple wireless service providers and bypass the wireline service provider entirely, if so desired. In a second embodiment, the wireless communications interface is directly connected to the phone appliances, bypassing the installed wireline infrastructure. In a third embodiment, both wireline and wireless service are operative, and the wireless communications interface may include logic arbitration to route multiple calls to multiple phone appliances.

8 Claims, 10 Drawing Sheets

U.S. PATENT DOCUMENTS

| | | | |
|---|---|---|---|
| 5,911,120 A | 6/1999 | Jarett et al. | |
| 5,911,123 A | 6/1999 | Shaffer et al. | |
| 5,913,176 A | 6/1999 | Barabash | |
| 5,983,117 A | 11/1999 | Sandler et al. | |
| 6,002,937 A | 12/1999 | Young et al. | |
| 6,073,029 A | 6/2000 | Smith et al. | |
| 6,151,332 A * | 11/2000 | Gorsuch et al. | 370/466 |
| 6,208,854 B1 | 3/2001 | Roberts et al. | |
| 6,343,220 B1 | 1/2002 | Van Der Salm | |
| 6,400,964 B1 | 6/2002 | Zicker et al. | |
| 6,466,799 B1 * | 10/2002 | Torrey et al. | 455/462 |
| 6,526,026 B1 | 2/2003 | Menon | |
| 6,804,536 B1 | 10/2004 | Bultman | |
| 7,082,306 B2 | 7/2006 | Himmel et al. | |
| 7,454,230 B2 | 11/2008 | Bultman | |
| 2005/0186968 A1 | 8/2005 | Durst et al. | |

FOREIGN PATENT DOCUMENTS

| | | |
|---|---|---|
| GB | 2284727 A | 12/1993 |
| WO | WO 95/01070 | 1/1995 |
| WO | WO 98/19436 | 5/1998 |
| WO | WO 98/3777 | 9/1998 |

* cited by examiner

WIRELESS COMMUNICATIONS INTERFACE

CROSS REFERENCE TO RELATED APPLICATIONS

This application is a continuation of U.S. patent application Ser. No. 10/944,907, filed on Sep. 21, 2004, now allowed, titled "Interface for Subscriber-Based Wireless Phones to Wireline Infrastructure", which is a continuation of U.S. patent application Ser. No. 09/440,262, filed on Nov. 15, 1999, now U.S. Pat. No. 6,804,536, which claims the benefit of U.S. Provisional Application No. 60/140,679, filed Jun. 24, 1999, all of which are incorporated herein by reference in their entireties.

BACKGROUND OF THE INVENTION

1. Field of the Invention

The present invention is generally related to wireless communications and wireline communications. More particularly, the invention relates to an interface between wireless and wireline communications.

2. Background Art

Various systems and methods exist for providing telephone services, including wireless and wireline networks that carry voice and/or data communications.

BRIEF SUMMARY OF THE INVENTION

The present invention relates to a wireless communications interface that connects a wireless device to conventional wireline phone appliances, and to configurations employing the interface. In one embodiment, the wireless communications interface is connected to the phone appliances through existing phone jacks. This allows a user to place and receive calls over a wireless network using the existing wireline infrastructure in a building. By using the invention, users can consolidate their portable and fixed phone service with one of the multiple wireless service providers and bypass the wireline service provider entirely, if so desired. In a second embodiment, the wireless communications interface is directly connected to the phone appliances, bypassing the installed wireline infrastructure. In a third embodiment, both wireline and wireless service are operative, and the wireless communications interface may include logic arbitration to route multiple calls to multiple phone appliances.

Further features and advantages of the invention, as well as the structure and operation of various embodiments of the invention, are described in detail below with reference to the accompanying drawings. The drawing in which an element first appears is typically indicated by the leftmost character(s) and/or digit(s) in the corresponding reference number.

BRIEF DESCRIPTION OF THE DRAWINGS/FIGURES

The present invention will be described with reference to the accompanying drawings, wherein.

Figure 10A:
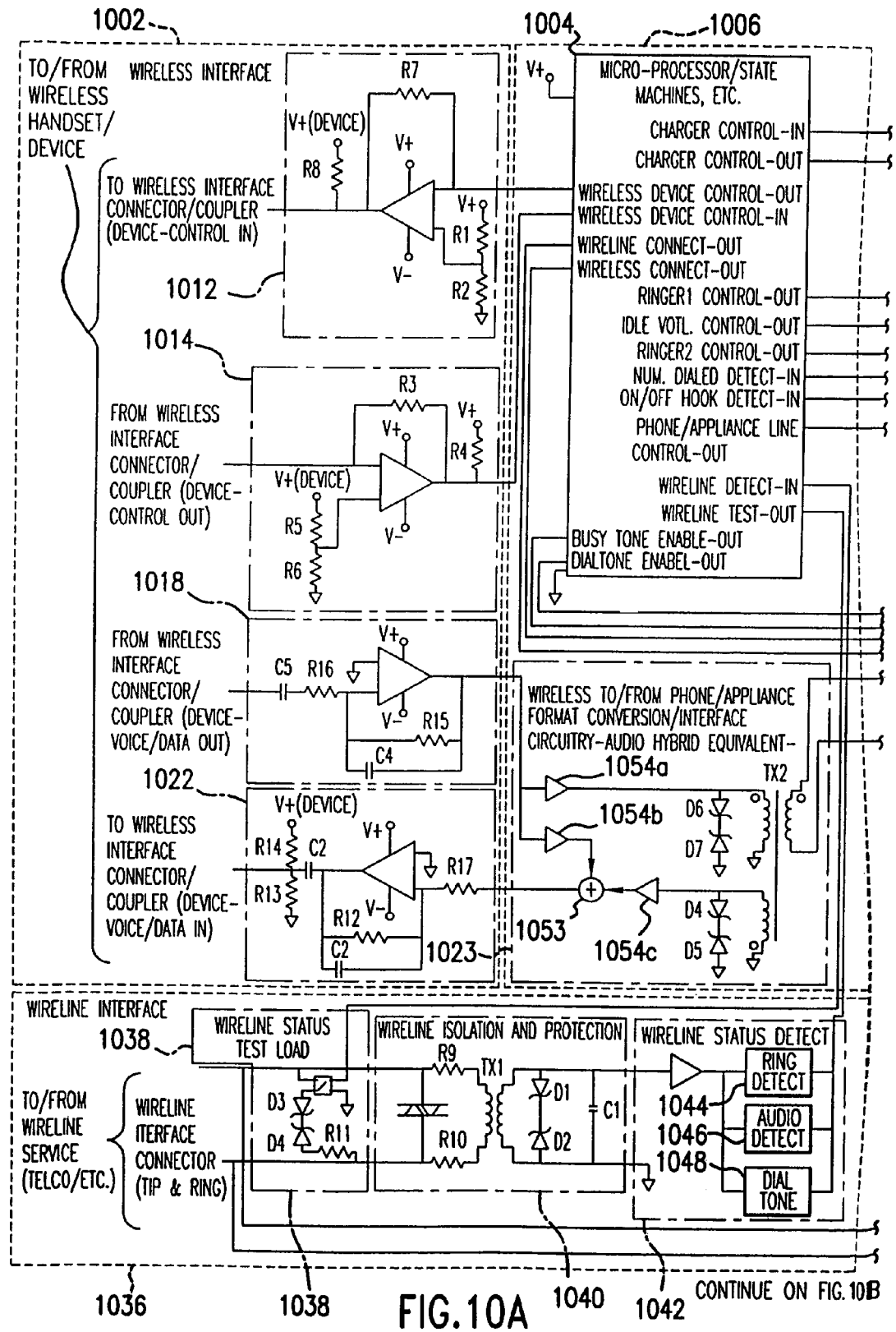
Figure 10B:
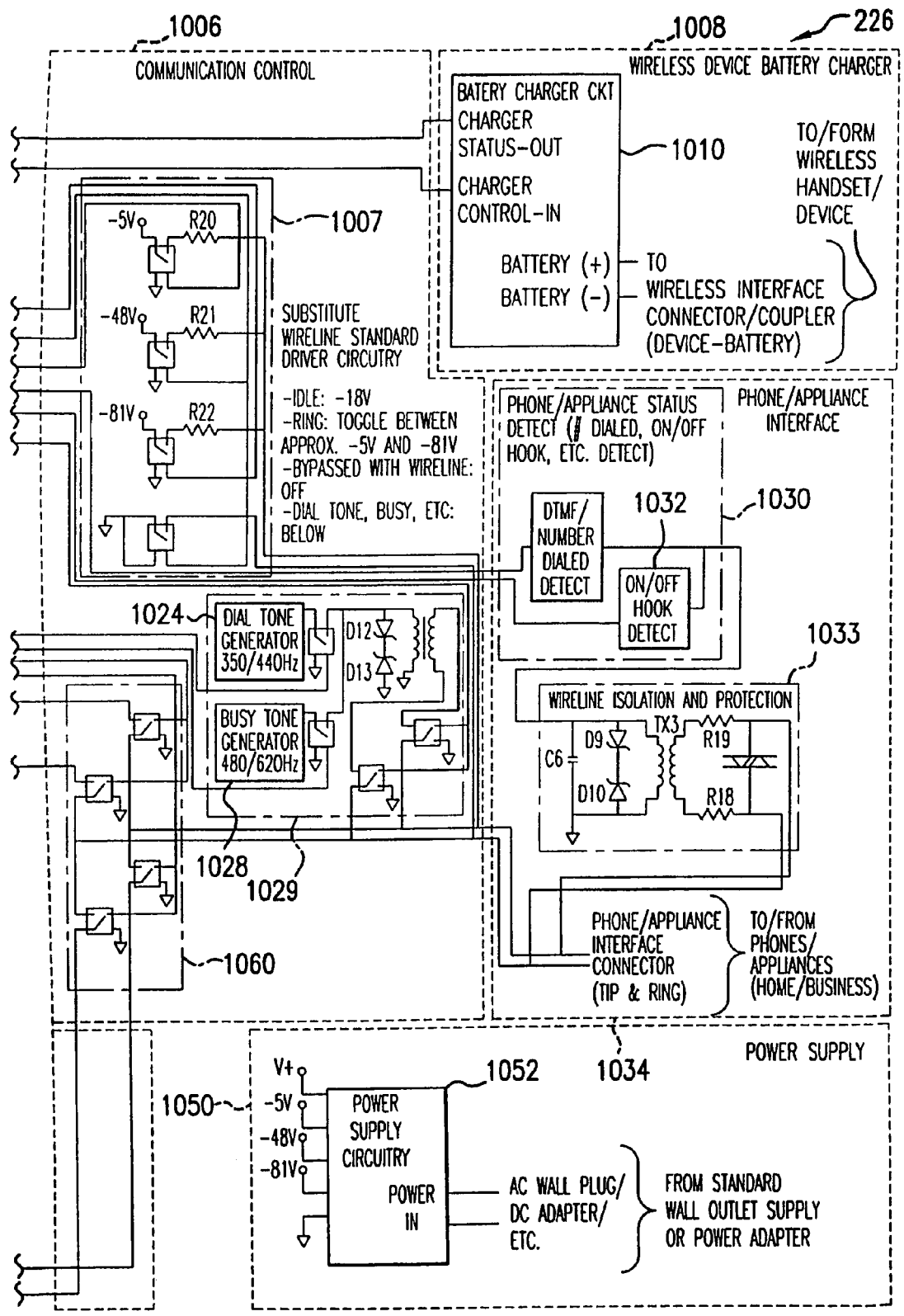
Figure 11:
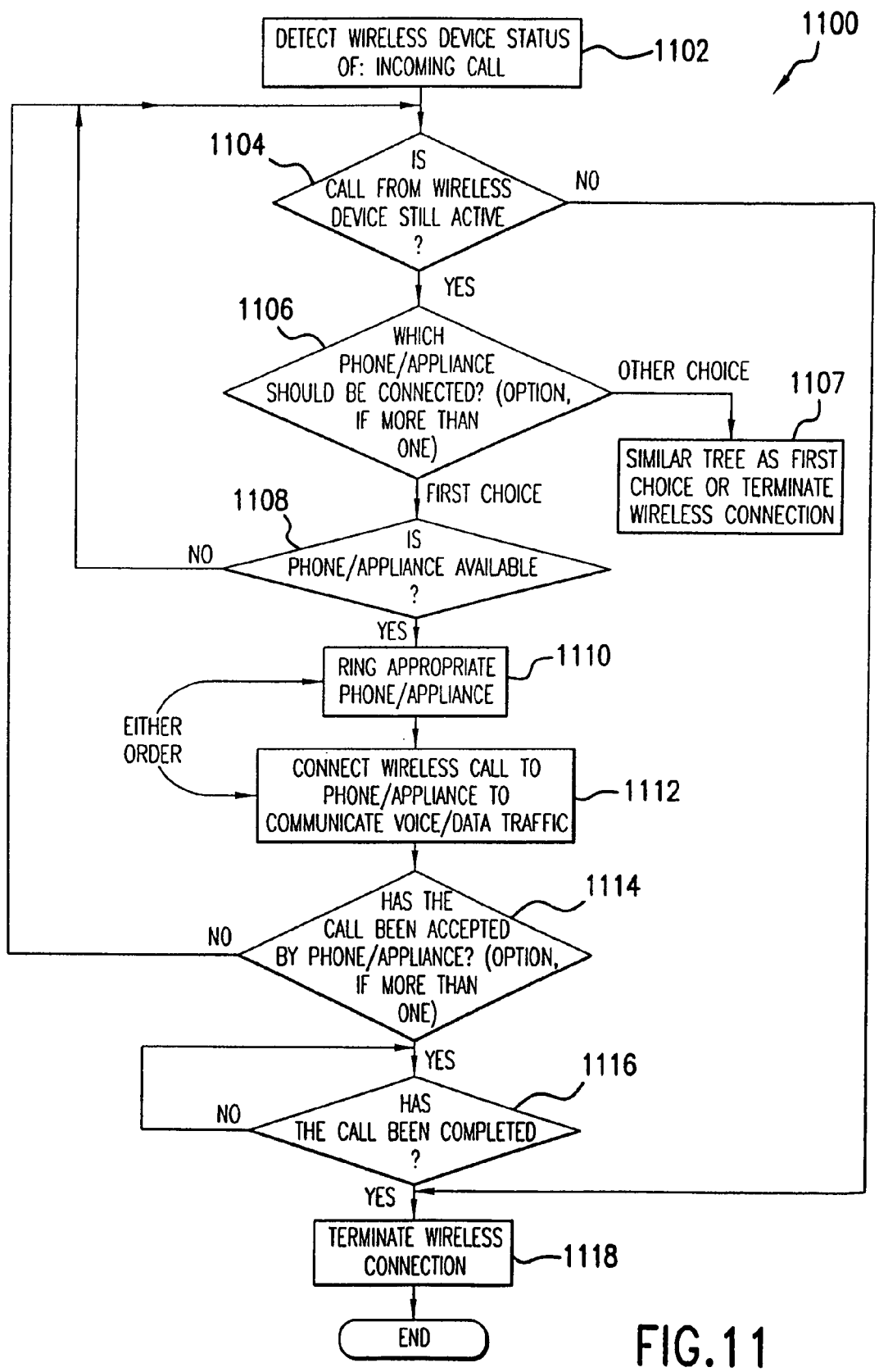
Figure 12:
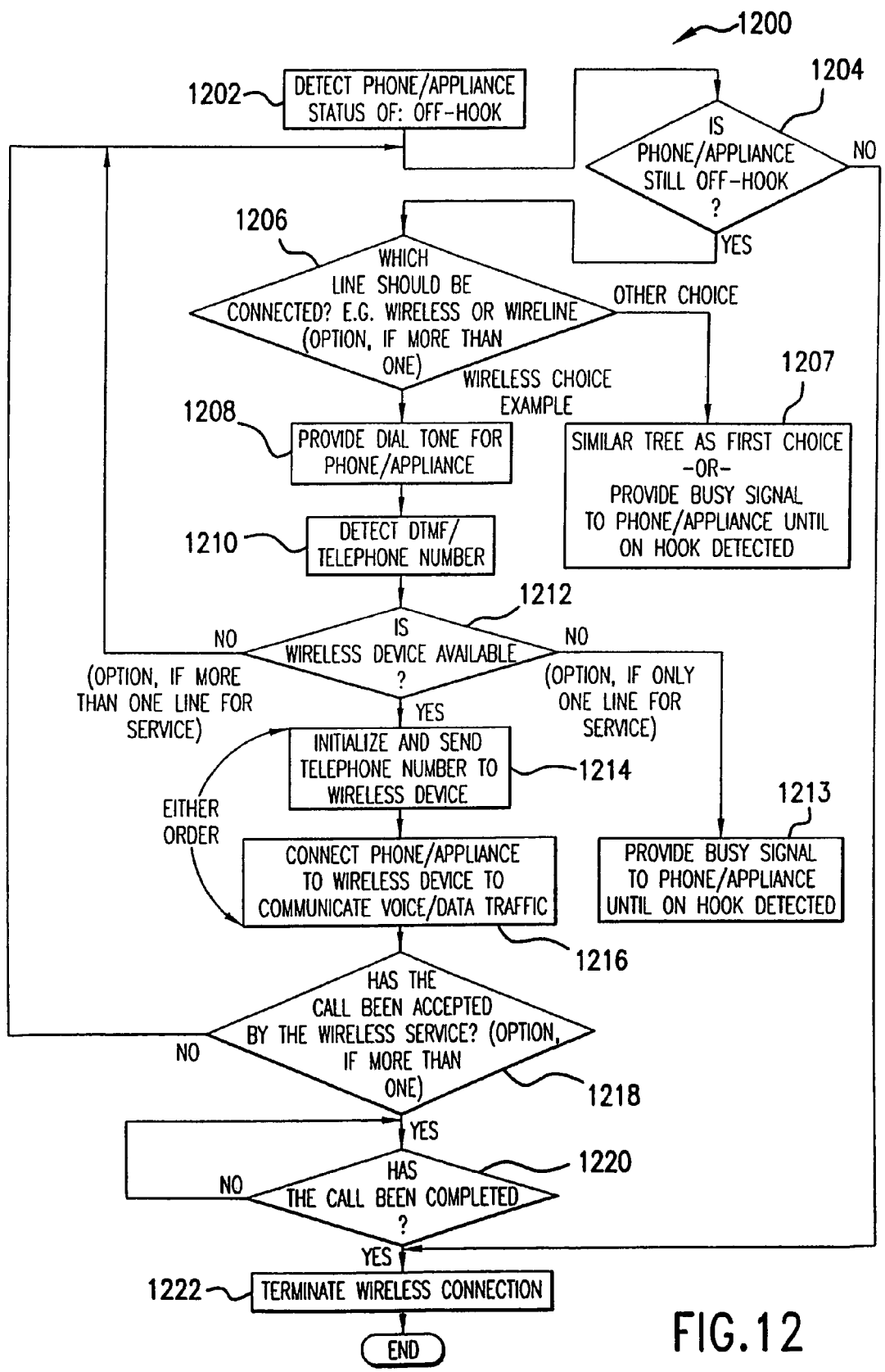

FIG. 10, which includes FIG. 10A and FIG. 10B, is a circuit implementation of the wireless communications interface according to embodiments of the invention. FIGS. 10A and 10B should be referred to for all references to FIG. 10 in the specification;

FIG. 11 is an operational flowchart for receiving a wireless call at a conventional wireline phone appliance, according to embodiments of the present invention; and FIG. 12 is an operational flowchart for placing a wireless call using a conventional wireline phone appliance, according to embodiments of the present invention.

DETAILED DESCRIPTION OF THE INVENTION

Figure 1:
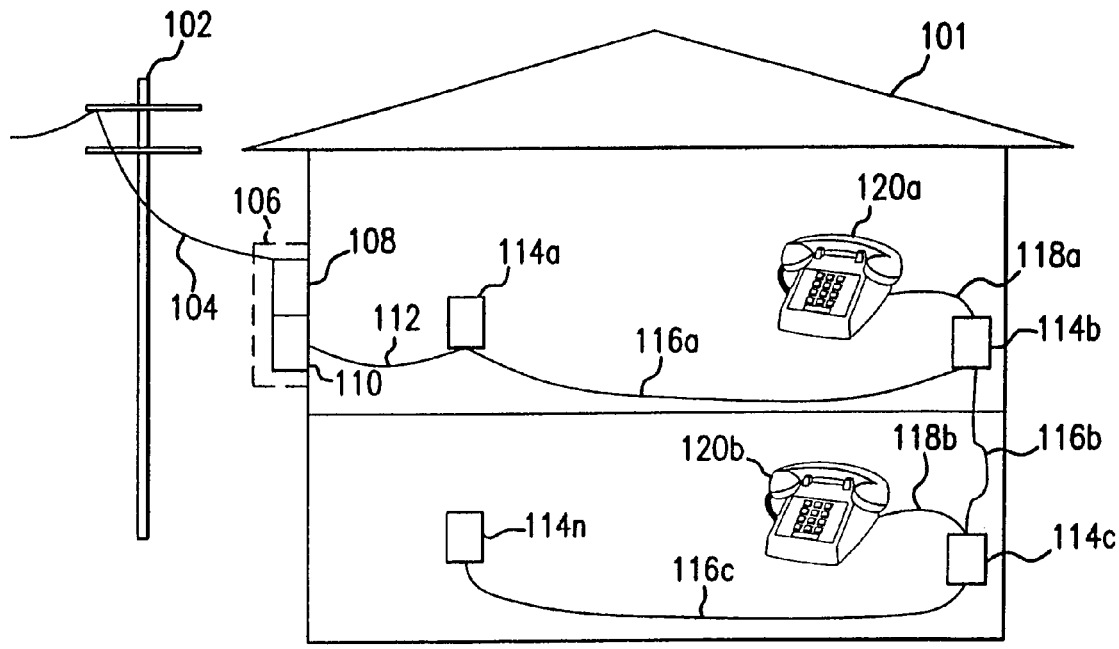
FIG. 1 is a diagram that illustrates conventional telephone service to a building.

Before describing the invention in detail, it is useful to describe conventional wireline telephone service. FIG. 1 illustrates conventional wireline telephone service to building 101. Conventional wireline service is typically offered and maintained over a regional area by a local service provider, such as one of the so called "Baby Bell" operating companies.

Referring now to FIG. 1, line 104 connects telephone service from telephone pole 102 to connector box 106. Connector box 106 preferably has a provider section 108 and a user section 110. Typically, the user (i.e. occupant of building 101) can access user section 110, but cannot access provider section 108. Line 112 connects user section 110 to phone jack 114a. Lines 116a-n connect phone jacks 114a-n together, as shown. Lines 118a,b connect phone jacks 114b,c to their respective phone appliances 120a,b. As illustrated, any calls received from line 104, will be distributed to phone jacks 114a-n, and to phone appliances 120a,b. Therefore, when a call is received, both telephones 120a and 120b will "ring", assuming they are standard wireline telephones (as opposed to say computer modems). As will be apparent, additional phone appliances 120 could be connected to the open phone jacks 114a and 114n in FIG. 1.

Throughout this application, the term "phone appliance" refers to any communications device that can be operated to send or receive voice and/or data communications using telephone networks. This includes but is not limited to: standard wireline telephones, cordless phones, computer modems, FAX machines, etc.

A disadvantage of using the conventional wireline telephone service is that a consumer has little choice when choosing a local wireline service provider. In fact, despite the Telecommunications Act of 1996, there is still only one choice for local wireline telephone service in most regions of the country, that being the local "Baby Bell" operating company. However, there are usually multiple choices for local wireless service and for long distance service. As will be shown, the present invention allows the user to connect the installed wireline infrastructure in a building to any of the available wireless service providers.

Figure 2:
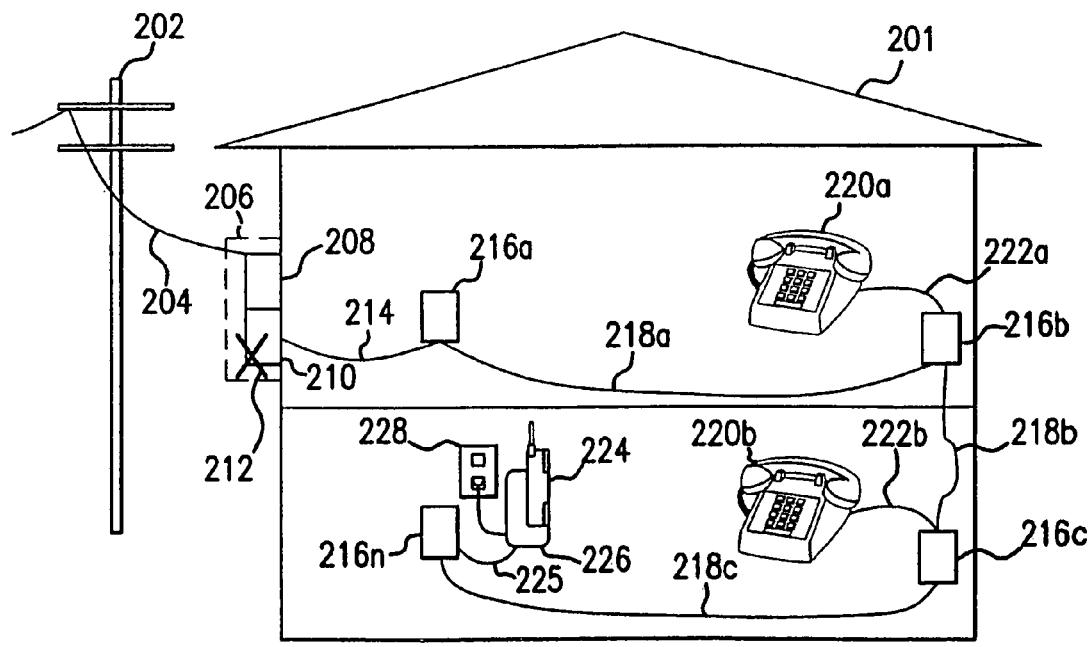
FIG. 2 is a diagram that illustrates telephone service to a building according to embodiments of the invention, where the wireline service has been disconnected.

FIG. 2 illustrates phone service to building 201 according to embodiments of the present invention. Referring to FIG. 2, line 204 connects telephone pole 102 to connector box 206 having user section 208 and provider section 210. "X" 212 indicates that the user has disconnected from the local wireline service provider, so that connector box 206 is inoperative. Line 214 connects user section 210 of connector box 206 to phone jack 216a, but line 214 is superfluous because connector box 206 is in-operative in FIG. 2. Lines 218a-n connect phone jacks 216a-n together as shown. Lines 222a,b connect respective phone jacks 216b,c to their respective phone appliances 220a,b. As will be apparent, additional phone jacks 216 and phone appliances 220 could be added. Line 225 connects phone jack 216n to wireless communications interface 226. Wireless communications interface 226 is coupled to wireless device 224, and is powered by outlet 228 according to one embodiment of the present invention. Wireless device 224 is capable of communicating voice and/or data over an associated wireless network (not shown). Wireless device 224 could be, for example, a cellular phone or a PCS phone.

Wireless communications interface 226 provides a conduit for voice and data communications between the wireless device 224 and the phone appliances 220a,b using the phone jacks 216a-n and the associated lines 218a-n. This allows a user in building 201 to place and receive calls over the wireless network (associated with wireless device 224), using the installed wireline infrastructure in building 201. Furthermore, calls can be placed over the wireless network without removing the wireless device 224 from the wireless interface 226, and therefore without discharging the batteries in the wireless device 224. In one embodiment, wireless communications interface 226 includes a battery charger for charging the batteries in wireless device 224. Further features and options of wireless communications interface 226 are discussed below.

As stated, the present invention connects the existing wireline infrastructure (phone jacks and appliances) in a building to a wireless network. Therefore, consumers may consolidate their portable and fixed phone services with one of the multiple wireless service providers, and bypass the (single) wireline service provider entirely, if desired. This will allow the consumer to receive all calls through a single phone number because the wireline service can be dropped. Furthermore, consumers will benefit from lower costs due to the following: increased competition for local phone services at fixed locations, customer's ability to change local service providers, removal of the need to pay two separate monthly service fees, and higher efficiency of installed infrastructure by removing redundant phone number usage.

Figure 3:
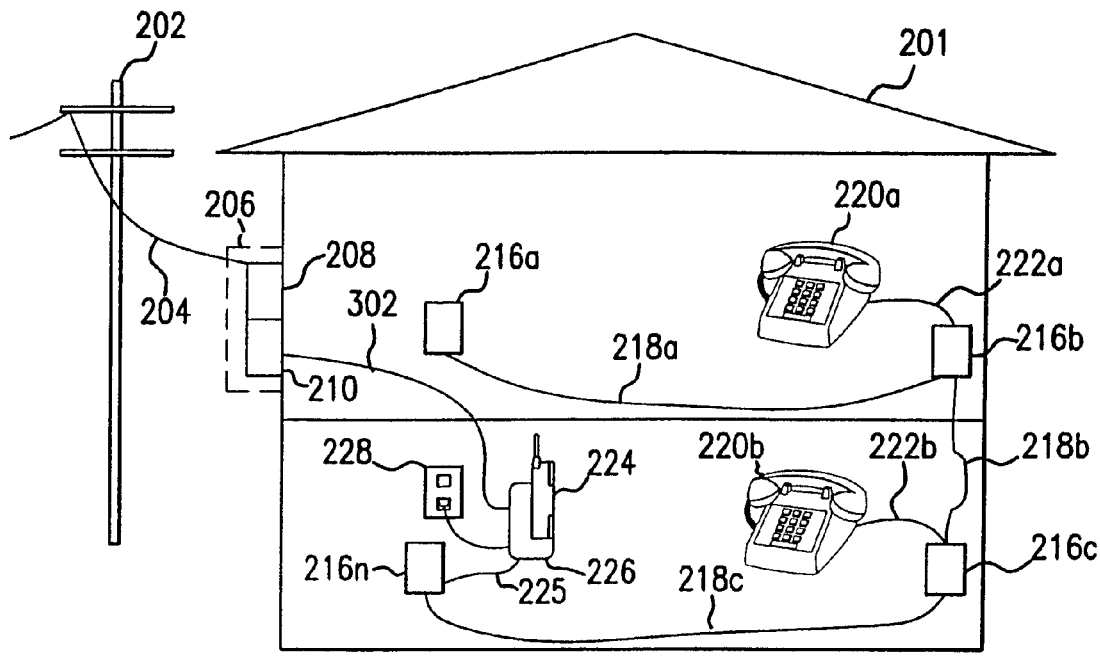
FIG. 3 is a diagram that illustrates telephone service to a building according to embodiments of the invention, where the wireline service is still connected.

FIG. 3 illustrates a second embodiment of the present invention. FIG. 3 is similar to FIG. 2 except that both wireless service and wireline service are active at building 201. (Active wireline service is depicted by the absence of an "X" on the connector box 206, as can be seen when comparing FIG. 3 with FIG. 2.) As such, wireline service is available from pole 202 and connector box 206. Line 302 connects user section 210 of connector box 206 to the wireless communications interface 226.

Still referring to FIG. 3, wireless communications interface 226 connects wireless service to phone appliances 220a,b using wireless device 224, as described in FIG. 2. Also, wireless communications interface 226 connects wireline service to phone appliances 220a,b through connector box 206. When the wireless line or the wireline is currently active with a call and a second call comes in on the other line, the wireless communications interface 226 may include logic arbitration that either drops the second call, or generates a "busy signal" that is sent over the respective phone network, or generates a "call waiting" signal that is sent to the phone appliances 220a,b. Alternatively, wireless communications interface 226 may include an answering machine to record a message when a second call comes in.

Figure 4:
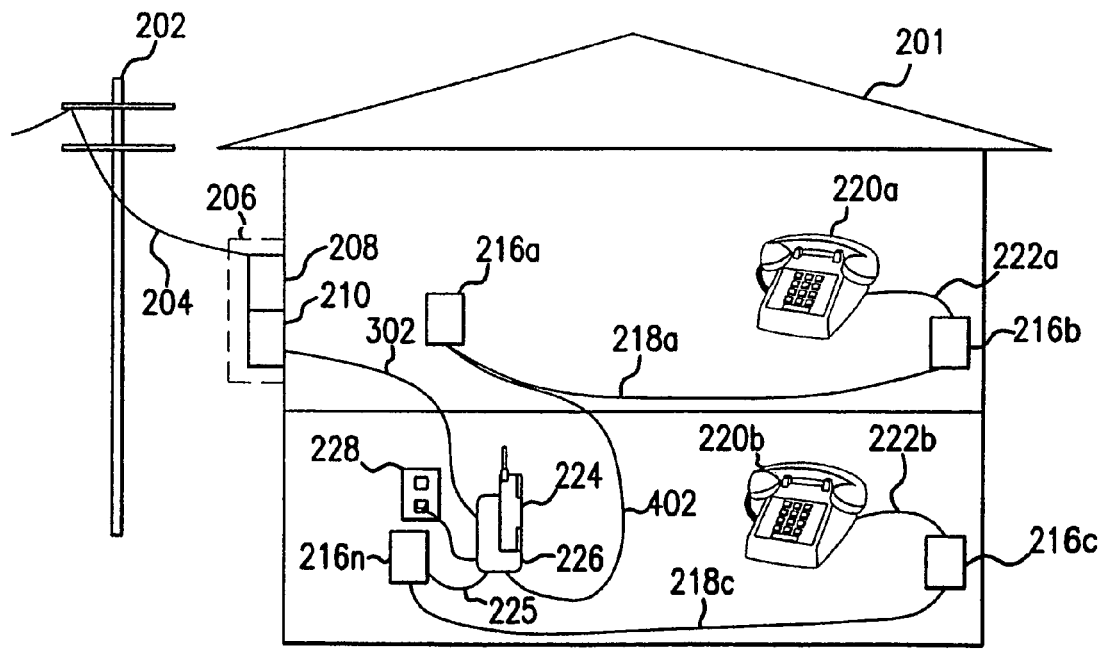
FIG. 4 is a diagram that illustrates telephone service to a building according to embodiments, where the wireline service is still connected, and where the wireless communications interface is connected to the phone appliances on the first floor using a first path, and is connected to the phone appliances on the second floor using a second path.

FIG. 4 illustrates a third embodiment of the present invention. FIG. 4 is similar to FIG. 3 in that both wireline and wireless communications are operative. However, line 218b between phone jacks 216b,c is removed, and line 402 to phone jack 216a is added. As such, wireless communications interface 226 can access phone appliance 220a and phone appliance 220b through separate infrastructure paths. When one of the phone appliances 220a or 220b is active with a call from the wireless line or wireline, and a second call comes in over the other line, the wireless communications interface 226 may include logic arbitration that locates a free phone appliance and sends the second call to the free phone appliance. Alternatively, wireless communications interface 226 may generate a "busy signal" or a "call waiting" signal in response to the second call.

Figure 5:
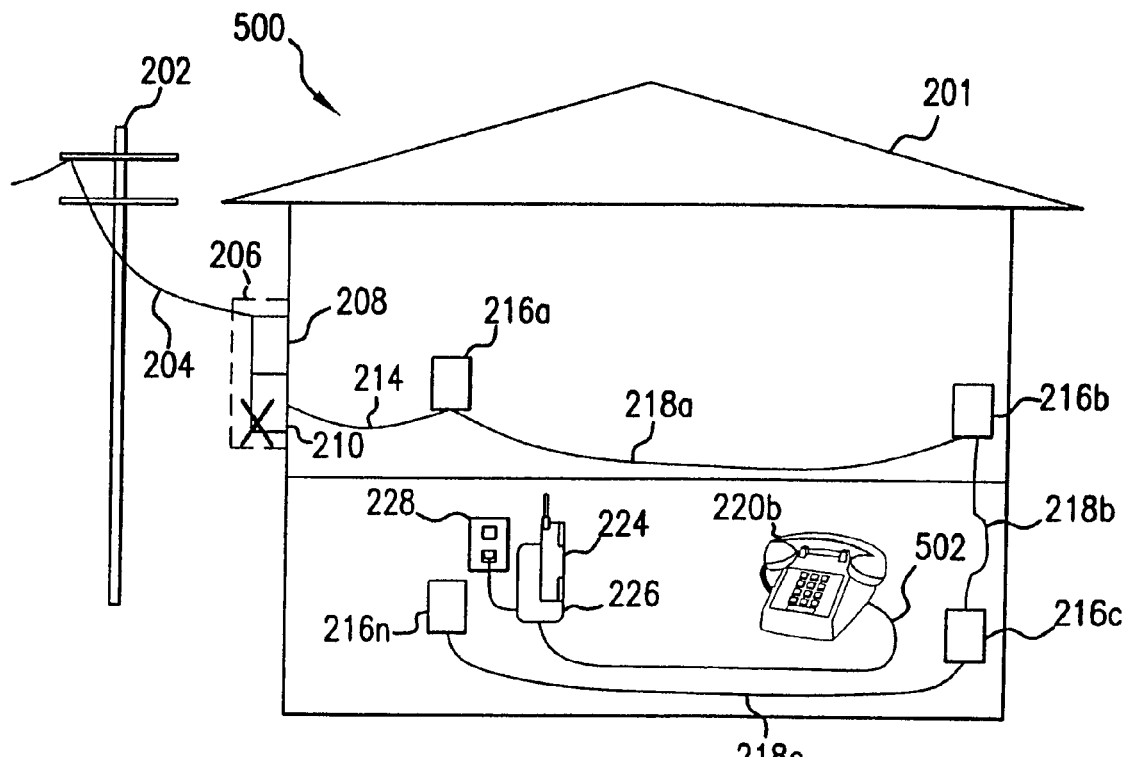
FIG. 5 is a diagram that illustrates telephone service to a building according to embodiments of the invention, where the wireless communications interface is directly connected to a phone appliance without using the building wireline infrastructure.

FIG. 5 illustrates a fourth embodiment of the present invention. FIG. 5 is similar to FIG. 2 in that the wireline service is cutoff, as is indicated by the "X" 212 on the connector box 206. Therefore, all communications go through the wireless device 224 and over the associated wireless network. However, as compared to FIG. 2, wireless communications interface 226 is directly connected to the phone appliance 220b, and therefore does not utilize the installed phone jacks 216a-n (and associated lines 218a-n) to access phone appliance 220b.

Figure 6:
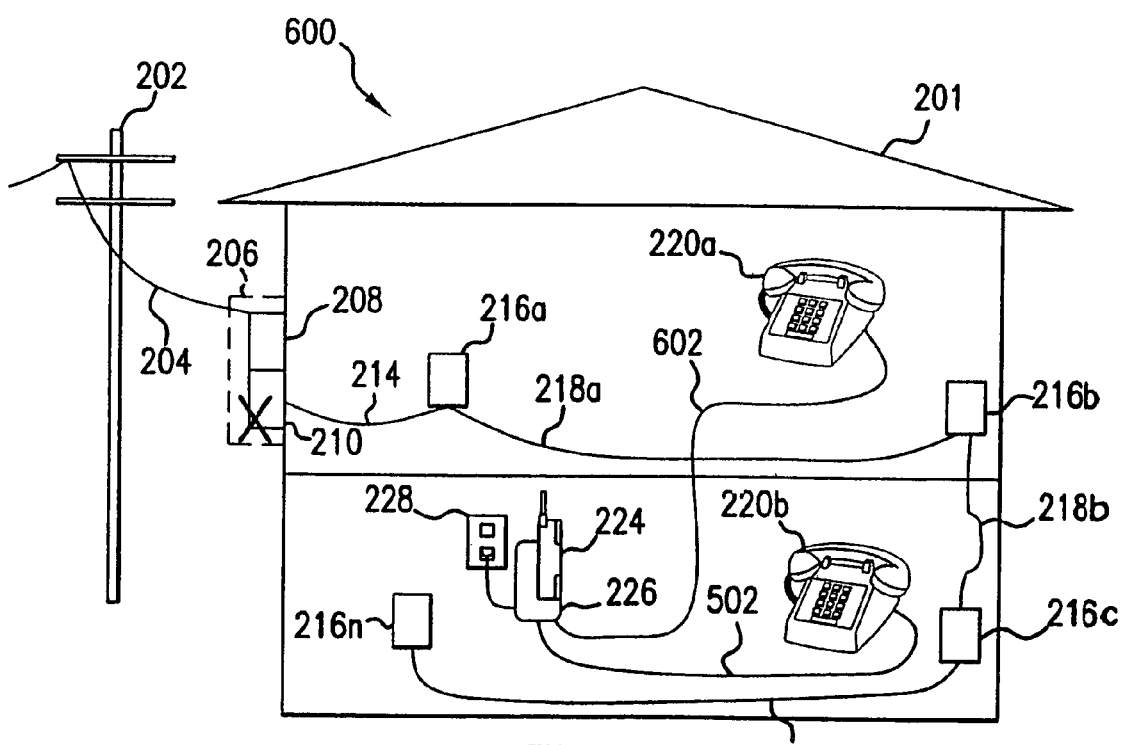
FIG. 6 is a diagram that illustrates telephone service to a building according to embodiments of the invention, where the wireless communications interface is directly connected to multiple phone appliances.

FIG. 6 illustrates a fifth embodiment of the present invention. FIG. 6 is similar to FIG. 5 in that wireline service is cutoff as indicated by "X" 212, and because wireless communications interface 226 is directly connected to phone appliance 220b. FIG. 6 also has an additional phone appliance 220a that is directly connected to wireless communications interface 226 using line 602. Based on FIG. 6, it is apparent that multiple phone appliances 220a-n could be directly connected to wireless communications interface 226.

Figure 7:
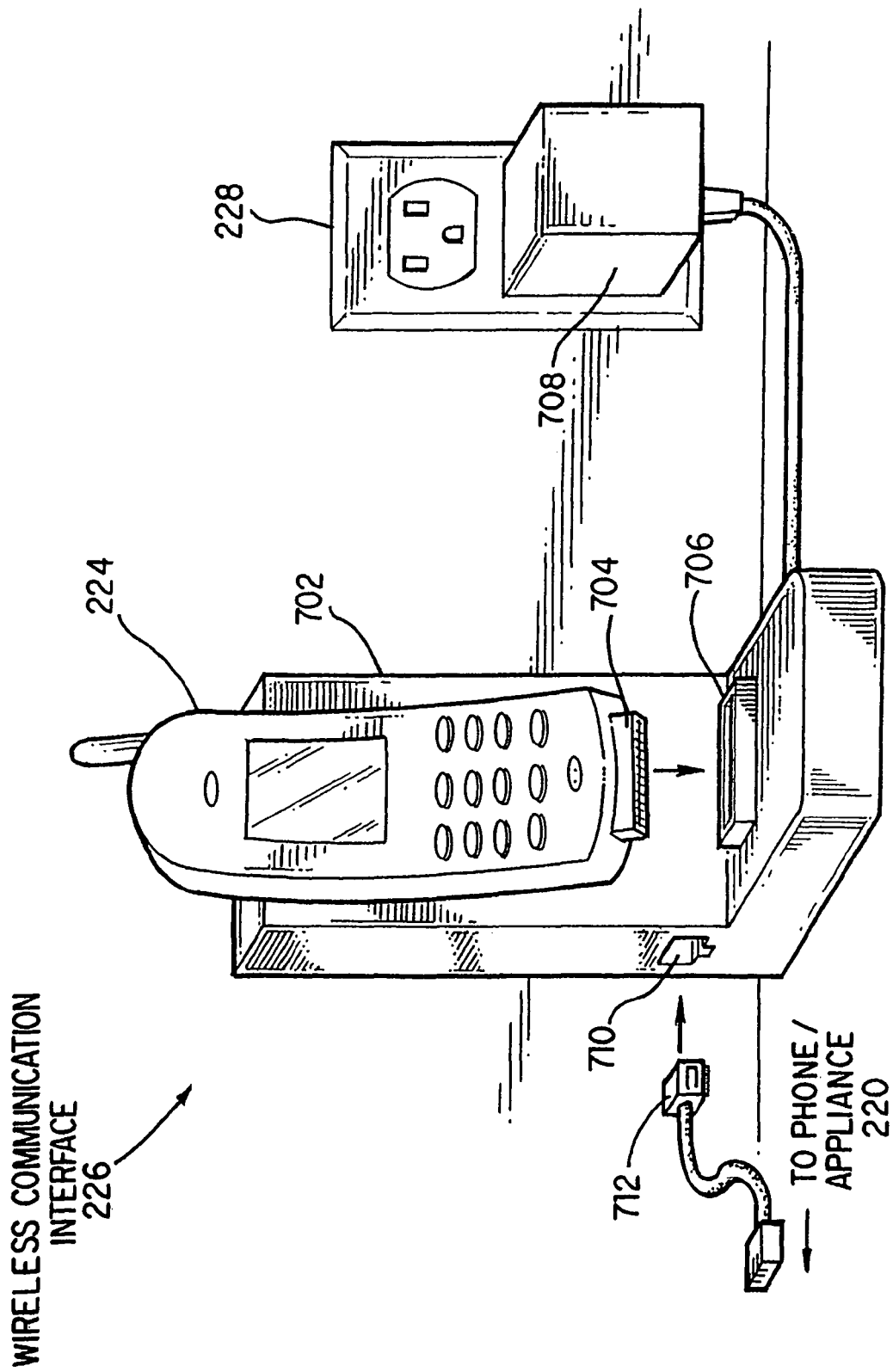
FIG. 7 is a diagram that illustrates a structural block diagram of a wireless communications interface according to embodiments of the invention.

FIG. 7 illustrates a structural diagram of wireless communications interface 226 according to one embodiment of the invention. Referring to FIG. 7, wireless communications interface 226 includes a base 702 that holds wireless device 224. Base 702 includes a connector 706 that mates to a connector 704 on the wireless device 224. Connectors 706 and 704 carry the voice and data traffic between the wireless communications interface 226 and the wireless device 224. Connectors 706 and 704 may also carry any control signals from wireless communications interface 226 to wireless device 224, and vice versa. Such control signals may include instructions to accept a call, terminate a call, and any advanced features that may be included.

Base 702 also includes a connector 710 that mates with a line 712, which carries the voice and data traffic to/from phone appliances 220. In a second embodiment, line 712 is permanently attached to base 702. As will be apparent, base

702 could have multiple connectors 710 (and associated lines 712) that separately connect to multiple phone appliances 220, as indicated in FIG. 6. In a third embodiment, a phone appliance 220 is built directly into the base 702 of the wireless communications interface 226, negating the need for the line 712.

In a preferred embodiment, wireless communications interface 226 includes a power adapter 708 that can be coupled to a standard power outlet 238. Power adaptor 708 supplies power to operate any logic circuits in wireless communications interface 226, and to operate (and "ring") the phone appliances 220 when a call comes in. The power adaptor 708 may also charge the batteries in wireless device 224 through connectors 706 and 704. Alternatively, power adaptor 708 is not utilized, and the batteries in wireless device 224 supply the power to operate any circuits in wireless communications interface 226. Alternatively, if the wireline service is still active (as depicted in FIGS. 3 and 4), then power can be drawn from the wireline service as will be understood by those skilled in the relevant arts.

Figure 8:
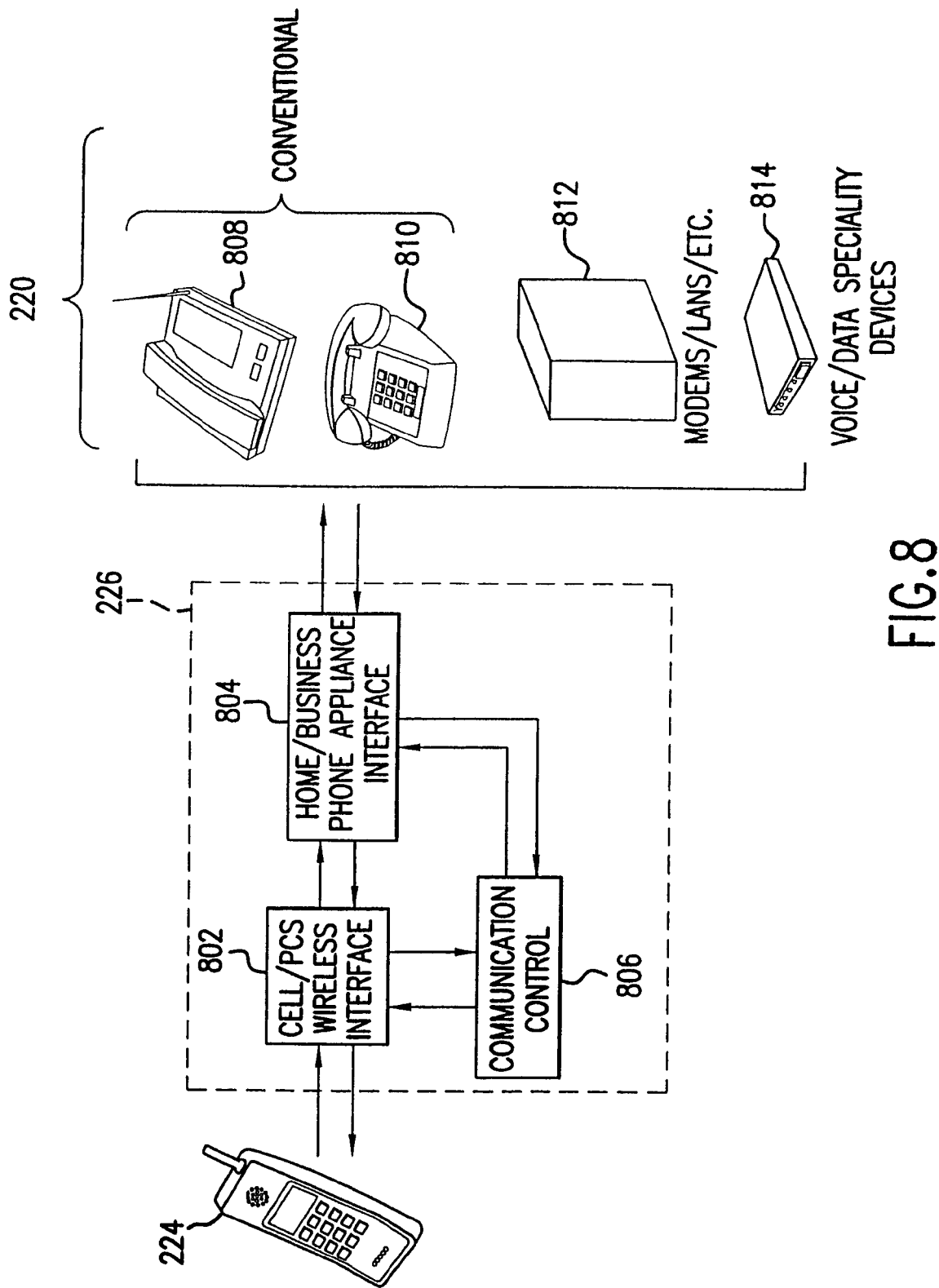
FIG. 8 is a diagram that illustrates a first functional block diagram of a wireless communications interface according to embodiments of the invention.

FIG. 8 illustrates a first functional block diagram of wireless communications interface 226 that couples wireless device 224 to phone appliances 220, either directly or via lines. As shown in FIG. 8, phone appliances 220 may include but are not limited to: conventional phones including cordless phones 808 and standard wireline phones 810; modems 812 for computers/PCS/LANs/etc; and voice/data specialty devices 814 including FAX machines and answering machines. As stated above, wireless device 224 is capable of communicating voice and/or data over an associated wireless network, and includes for example, cellular handsets and PCS handsets.

Still referring to FIG. 8, wireless communications interface 226 includes a cell/PCS wireless interface 802, a phone appliance interface 804, and a communication control 806. Cell/PCS wireless interface 802 communicates the voice and data traffic between wireless device 224 and the phone appliance interface 804. If the voice/data traffic from the phone appliance 220 is compatible with the signal protocol used by wireless device 224, then the cell/PCS wireless interface 802 may be nothing more than a connector, such as connector 706. If the protocols are incompatible, then cell/PCS interface 802 includes the circuitry to convert the voice and data traffic into a compatible protocol for the wireless device 224.

Phone appliance interface 804 communicates the voice and data traffic between the cell/PCS interface 802 and a phone appliance 220. If the voice/data traffic from the wireless interface 802 is compatible with the phone appliance 220, then the phone appliance interface 220 could be nothing more than a phone jack and the ringer circuit to generate the voltages necessary to "ring" the phone appliance for an incoming call. If the protocols are incompatible, then phone appliance interface 804 includes circuitry to convert the voice and data traffic to a format that is compatible with the phone appliance 220.

Communications control 806 controls the voice and data traffic between wireless device 224 and phone appliances 220 by monitoring these devices. For example, when a user lifts the receiver of a phone appliance 220 to make a new call, communications control 806 causes the phone appliance interface 804 to generate a dial tone for the respective phone appliance. Once the phone number is identified by the user, the communications control 806 causes the wireless device 224 to open a channel on the wireless network, and dial the number to place the call. After the call is complete and the user has hung-up the receiver on the phone appliance, then the communications control 806 causes the wireless device 224 to close the opened channel on the wireless network. Also, when an incoming call is received by wireless device 224, the communications control 806 determines if the call is to be accepted, and may also determine which phone appliance 220 to ring using the phone appliance interface 804.

Figure 9:
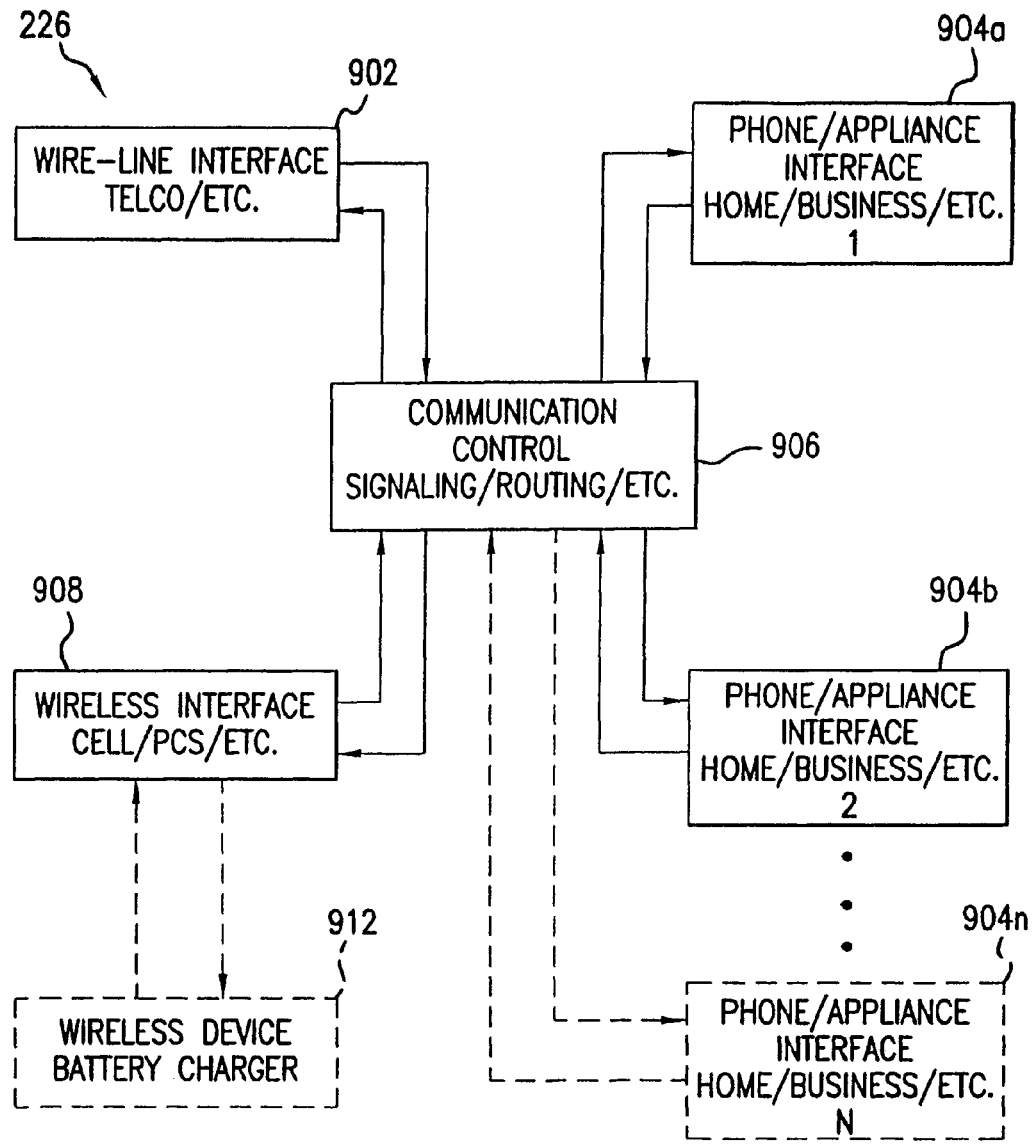
FIG. 9 is a diagram that illustrates a second functional block diagram of a wireless communications interface according to embodiments of the invention.

FIG. 9 illustrates a second functional block diagram of wireless communications interface 226. FIG. 9 includes: wireline interface 902, phone appliance interfaces 904*a-n*, communication control 906, wireless interface 908, and battery charger 912. Battery charger 912 and the phone appliance 904*n* are optional as indicated by the dashed lines. Wireline interface 902 provides an interface to the local wireline service provider when the wireline service is still active, as is the case in FIGS. 3 and 4. Phone appliance interfaces 904*a-n* provide an interface to various corresponding phone appliances 220*a-n*. The phone appliance interfaces 904*a-n* operate similar to that of phone appliance interface 804 in FIG. 8, to which the reader is referred for further detail. Wireless interface 908 provides an interface to a wireless device 224, similar to wireless interface 802 in FIG. 8, to which the reader is referred for further detail. Battery charger 912 is coupled to wireless interface 908, and charges the batteries in the wireless device using an external power source, such as an AC wall outlet. Communication control 906 controls the routing of the voice and data traffic. In other words, the communication control 906 routes voice and data traffic between wireline interface 902 and the phone appliances 904*a-n*. Likewise, communications control 906 routes the voice and data traffic between wireless interface 908 and the phone appliances 904*a-n*.

Communications control 906 also generates and receives the necessary control signals to operate wireless communications interface 226. This includes the arbitration necessary to route multiple calls to multiple phone appliances when both wireline and wireless services are operative. For example, when a call is active on either the wireline or wireless line and a second call comes in on the other line, the communications control 906 determines if any of remaining phone appliances 220*a-n* are inactive (i.e. not participating in the first call), and may route the second call to one or more of the inactive phone appliances. Alternatively, the communications control 906 may cause a "busy signal" to be generated, or may send a "call waiting" signal to the phone appliance(s) that are participating in the first call.

FIG. 10 illustrates a circuit implementation of the functional blocks shown in FIG. 9 for the wireless communications interface 226, according to embodiments of the invention. FIG. 10 includes wireless interface 1002, communications control 1006, wireless battery charger 1008, wireline interface 1036, phone appliance interface 1034, and a power supply 1050. Phone appliance interface 1034 is a representative phone appliance interface, as multiple phone appliance interfaces can be connected to the wireless communications interface 226, as shown by phone appliance interfaces 904*a-n* in FIG. 9.

FIG. 10 is meant for purposes of illustration and not limitation. The invention is not limited to the particular circuit implementation examples described in FIG. 10. Alternate implementations (including software and firmware implementations) will be apparent to person skilled in the relevant art(s) based on the teachings contained herein. Such alternate implementation(s) fall within the scope and spirit of the present invention. Furthermore, the illustrated example embodiment in FIG. 10 is intended to show signal flow for a functional understanding of the invention. Various designs of the invention may use more or fewer actual wires per signal described. As is also understood in the art, integration of the shown functions into readily available and custom designs may be used to minimize cost and size.

Wireless interface 1002 is a circuit implementation of the wireless interface 908 in FIG. 9. Wireless interface 1002 includes level shifters 1012, 1014 and amplifier circuits 1018, 1022. Level shifter 1012 provides any voltage shift that is necessary for the control signals that are sent from microprocessor 1004 (in communication control interface 1006) to the wireless device 224. Similarly, level shifter circuit 1014 provides any necessary voltage level shift for control signals that are sent from the wireless device 224 to the microprocessor 1004. (Various control signals associated with the wireless device 224 were described in the text associated with FIGS. 8 and 9, to which the reader is referred for more detail.) Level shifters 1012, 1014 includes a comparator and various resistors, the operation of which will be apparent those skilled in the relevant arts. Level shifters 1012, 1014 are unnecessary if microprocessor 1004 and wireless device 224 can communicate control signals without any voltage level shift. Furthermore, the control signals may be bi-directional on a single line, instead being on separate lines as shown in FIG. 10.

Still referring to the wireless interface 1002, amplifier 1018 amplifies (or attenuates) the voice and data traffic from wireless device 224, as necessary. Likewise, amplifier 1022 amplifies (or attenuates) the voice and data traffic to wireless device 224, as necessary.

Communication control 1006 is a circuit implementation of communications control 906 in FIG. 9. Communications control 1006 includes: microprocessor/state machine 1004, audio hybrid equivalent 1023, substitute wireline standard driver circuit 1007, tone generator circuit 1029, and switch module 1060. Tone generator 1029 includes dial tone generator 1024 and busy tone generator 1028.

Switch module 1060 connects either the wireless interface 1002 or the wireline interface 1036 to the phone appliance interface 1034, so that the voice/data traffic can flow between the selected medium and the phone appliance 220. Microprocessor 1004 controls which medium is currently selected by operating switch module 1060. Additional functionality for microprocessor 1004 is discussed below.

Microprocessor 1004 sends and receives control signals that operate the various components of the wireless interface 226, as indicated by the pin-out labels on microprocessor 1004. More specifically, these control signals include: wireless device control signals to communicate with wireless device 224; switch control signals that select either the wireless or wireline medium; busy tone enable signals and dial tone enable signals to control dial tone and busy signal generation by tone generator 1029; charge control signals to control the powering and charging of the wireless device 224 by the battery charge circuit 1010; ringer control signals to control the "ringing" of the phone appliances 220 by substitute wireline standard driver circuit 1007; hook detect signals to detect when the phone appliance 200 goes off-hook; dial detect signals to identify the phone number of a new outgoing call, which may utilize a separate DTMF detect circuit 1030; wireline detect signals to detect a new call or ongoing call on the wireline medium; and wireline test load signals to control a wireline load that simulates a receive off-hook condition to the wireline phone company.

Substitute wireline standard driver circuit 1007 "rings" the phone appliances 220 to announce an incoming call over the wireless line. Substitute wireline standard driver circuit 1007 includes various voltage sources, switches, and resistors that are controlled by microprocessor 1004 to ring phone appliances 220. The voltage sources vary depending the specific type of phone appliance. In one embodiment for a standard telephone, the substitute wireline standard driver circuit 1007 toggles between −5 volts and −81 volts to ring an attached phone appliance when microprocessor 1004 detects an incoming call.

Tone generator 1029 includes dial tone generator 1024, busy tone generator 1028, and various switches and isolation transformers as shown. Dial tone generator 1024 generates a dial tone when microprocessor 1004 detects a new off-hook signal from the phone appliance interface 1034 that indicates the receiver (or equivalent) is off-hook. Dial tone generator 1024 is primarily used when the wireless device 224 is utilized as the communications medium, as opposed to the wireline medium. When the wireline medium is used, the wireline phone company can provide dial tone through wireline interface 1036, as is described below. Busy tone generator 1028 generates a busy tone that is sent to phone appliance 1034. Busy tone generator 1028 is activated by microprocessor 1004 when the telephone number for an outgoing call on the wireless medium is determined to be busy. When the wireline medium is used, the wireline phone company can generate its own busy signal which is sent to the phone appliance through the wireline interface 1036 and the switch module 1060, as will be understood by those skilled in the arts.

Audio hybrid equivalent 1023 includes various buffer amplifiers 1054, a summer 1053, and a transformer circuit 1056, the operation of which will be apparent to those skilled in the arts. Other known hybrid circuits could be used. This conventional audio hybrid equivalent converts between the "tip and ring" signal, which includes both received and transmitted voice/data, and the separate "receive" and "transmit" signals/lines used to and from the wireless handset/device through buffer amps 1022 and 1018 in this embodiment. Various telecommunications circuits are described in: The Art of Electronics, 2nd edition, authored by Horowitz and Hill, published by Cambridge Press, copyright 1989, p. 931-944, which is incorporated by reference herein in its entirety. Additional telecommunications circuits are described in: Communications Device Data Book, edition Q1/96, DL136, REV4, authored and published by Motorola, Inc, copyright 1995, which is incorporated by reference herein in its entirety. Additional telecommunications circuits are described in: Encyclopedia of Electronic Circuits, Vol. 3, authored by Rudolf Graf, published by McGraw-Hill, copyright 1985, p. 602-622, which is incorporated by reference herein in its entirety.

Phone appliance interface 1034 is a circuit implementation of phone appliance interface 904. Phone appliance interface 1034 includes DTMF/number dialed detect circuit 1030, on/off hook circuit 1032, and isolation circuit 1033. The on/off hook circuit 1032 monitors the phone appliance to detect whether the phone appliance receiver (or equivalent mechanism) is on-hook or off-hook, and notifies microprocessor 1004. A new off-hook signal usually indicates that a new call is to be placed, and a new on-hook signal usually indicates the termination of a call, as will be understood by those skilled in the arts. If the invention is configured with multiple methods of sending a call, e.g. the illustrated example embodiment with a wireless route and a wireline route, the phone/appliance interface may send a first character(s) (number, *, #, etc.) to identify which method is to be used for calling. A default may also be established so that when no selection is made, then a default method is used. (i.e. the wireline service if it is available.)

When the wireless device is the medium of choice for a new call, microprocessor 1004 enables the dial tone generator 1024 to provide a dial tone to a phone appliance 220 as described above. DTMF circuit 1030 detects the numbers dialed by the user and notifies the microprocessor 1004, which arranges the connection through the wireless device 224. When the wireline is the medium of choice, the microprocessor 1004 connects the phone appliance directly to the wireline telephone company through switch module 1060 and the wireline interface 1036. Isolation circuit 1033 provides isolation and surge protection as will be understood by those skilled in the arts.

Wireline interface 1036 is a circuit implementation of wireline interface 902. Wireline interface 1036 includes: test load circuit 1038; isolation circuit 1040; wireline status detect circuit1042 that includes ring detect 1044, audio detect 1046, and dial tone detect 1048. Test load circuit 1038 provides a load that is approximate to the load seen by the telephone company when a receiver of a standard phone appliance is off-hook. Therefore, when a user wants to place a call over the wireline medium, the microprocessor 1004 switches in the test load, which prompts the wireline telephone company to provide a dial tone for an out-going call. This is then used to determine the wireline's availability to place a new call. Once it is determined that the wireline is available, the phone appliance interface 1034 is connected to the wireline interface 1036 through the switch module 1060. Isolation circuit 1040 provides isolation and surge protection, as will be understood by those skilled in the relevant arts.

Wireline status detect circuit 1042 notifies the microprocessor 1004 of the status of the wireline. More specifically, ring detect circuit 1044 detects the ringing voltages that indicate an incoming call over the wireline. In response, microprocessor 1004 may connect the wireline medium to phone appliance interface 1034 if the associated phone appliance 220 is available. Audio detect 1046 detects any audio signals on the wireline and notifies microprocessor 1004. In response, microprocessor 1004 may then steer any new outgoing calls to the wireless line (because the wireline is apparently in use). Dial tone detect circuit 1048 informs the microprocessor 1004 when a dial tone is available on the wireline from the telephone company. In response, microprocessor 1004 may couple a phone appliance 220 to the wireline medium through switch module 1060, so that a new call can be made.

As is apparent from the charger module 1008 in FIG. 10, the charger circuit 1010 is connected to the battery of the wireless device 224, enabling the wireless device 224 to be powered and/or charged while connected to the invention. In this embodiment, the charger module 1008 is under control of the microprocessor 1004. Other specific means of performing the charge and/or powering functions for a specific wireless device may be utilized as would be understood by those skilled in the arts.

Power supply 1050 is coupled to an independent power supply (such as AC outlet) and provides the necessary power conversion to operate the various circuits in wireless interface 226.

Added features, such as reply to wireline service and integrated functions, may be added and/or controlled as is known in the art, in a similar manner as that shown for the phone/appliance interface(s).

The wireless communications interface in FIG. 10 is further described in flowchart 1100 that is shown in FIG. 11. Flowchart 1100 depicts a set of operational steps for receiving a call over a wireless network at a conventional phone appliance, according to embodiments of the invention. Flowchart 1100 is described as follows.

In step 1102, the microprocessor 1004 detects the status of the wireless device 224 by monitoring the appropriate control signals, and thereby detects an incoming call to the wireless device 224.

In step 1104, the microprocessor 1004 determines if the incoming call from the wireless device 224 is still active. If yes, then control flows to step 1106. If no, then control flows to step 1118 to terminate the wireless connection. Immediately upon detection, it is most likely that the incoming call is still active. Step 1104 is directed at call scenarios where multiple passes through the flowchart loop(s) are necessary because a phone appliance 220 is not currently available, or because the incoming call has not been accepted by an available phone appliance.

In step 1106, the microprocessor 1004 determines which phone appliance 220 should be connected to the wireless device 224. A hierarchy of choices (of phone appliances) may be pre-programmed in the microprocessor 1004, assuming there is more than one phone appliance 200 connected to the wireless interface. The first time through the flowchart loop, the microprocessor 1004 selects a first choice for phone appliance and control flows to step 1108. If multiple passes through the flowchart loop are necessary, then the microprocessor 1004 selects another choice for the phone appliance 220 and control flows to step 1107. Step 1107 contains a tree (of steps) similar to those following the first choice using another phone appliance. If all the choices have been exhausted, then step 1107 may terminate the wireless connection.

In step 1108, the microprocessor 1004 determines if the chosen phone appliance 220 is available (i.e. not already in use) by checking the appropriate on/off hook detect signal for the chosen phone appliance. If yes, then control flows to step 1110. If the chosen phone appliance is not available then control returns to step 1104. Another phone appliance 220 may be selected in step 1106 if the incoming call is still active.

In step 1110, the microprocessor 1004 causes the chosen phone appliance 220 to ring in order to announce the incoming call. More specifically, the microprocessor 1004 toggles the switches in the substitute wireline standard driver circuit 1007 to generate the voltage signals that drive the ringer in the chosen phone appliance 220.

In step 1112, the microprocessor 1004 connects the incoming wireless call to the chosen phone appliance 220. If necessary, the microprocessor 1004 switches the switch module 1060 so that the wireless interface 1002 is coupled to the phone appliance interface 1034. As indicated in FIG. 11, steps 1110 and 1112 can occur in reverse order.

In step 1114, the microprocessor 1004 determines if the call has been accepted (e.g. answered) by the chosen phone appliance 220 in response to step 1110. More specifically, the hook detect circuit 1032 (in the phone appliance interface 1034) signals the microprocessor 1004 when the chosen phone appliance 220 goes off-hook. An off-hook condition occurs, for example, when a user lifts a phone receiver, or otherwise activates a phone appliance for communication. An off-hook condition may also be triggered by an answering machine, or FAX machine, as will be understood by those skilled in the relevant arts. Once the call is accepted, then voice/data traffic may be communicated between the wireless device 224 and the chosen phone appliance 220, and control flows to step 1116. If the call is not accepted, for instance, a set period of time expires, then control returns to step 1104, where the microprocessor 1004 determines if the incoming call is still active. After which, another phone appliance 220 may be selected to receive the call in step 1106 if the phone appliance is still active.

In step 1116, the microprocessor 1004 periodically monitors the call to determine if the call has been completed. To do so, the microprocessor 1004 monitors the wireless device 224 to determine if it is still active. Also, the microprocessor 1004 monitors any signals from the hook detect circuit 1032 to determine if the chosen phone appliance 220 has gone on-hook, which would terminate the call. If the call is complete, then control flows to step 1118.

In step 1118, the microprocessor 1004 terminates the wireless connection in order to minimize air-time on the wireless network. In other words, the microprocessor 1004 instructs the wireless device 224 to disconnect from the wireless network if it has not already done so. This step is not necessary if call was terminated on the wireless end, and the wireless device has already gone inactive.

The wireless communications interface in FIG. 10 is further described in flowchart 1200 that is shown in FIG. 12. Flowchart 1200 depicts a set of operational steps for placing a call over a wireless network from a conventional phone appliance, according to embodiments of the invention. Flowchart 1200 is described as follows.

In step 1202, the microprocessor 1004 monitors the status of a phone appliance 220 to determine if the phone appliance 220 goes off-hook. More specifically, the hook detect circuit 1032 detects an off-hook condition for the phone appliance 220, and notifies the microprocessor 1004 using the appropriate control line. For a standard telephone, the off-hook condition occurs when a user removes the phone receiver from the cradle, or otherwise activates the phone to initiate a call.

In step 1204, the microprocessor 1004 determines if the phone appliance 220 is still off-hook. If yes, then control flows to step 1206. If no, then control flows to step 1222, in order to terminate the call. Step 1204 is primarily directed at call scenarios where multiple passes through the flowchart loop(s) occur because either no line (wireless or wireline) is free, or because the outgoing call has not been accepted. In which case, the user may decide to terminate the call instead of waiting for a line to free up.

In step 1206, the microprocessor 1004 determines whether the wireless or the wireline service should be connected to the phone appliance 220, assuming that both are available. As with the receiver flowchart, a hierarchy of choices may be pre-programmed in the microprocessor 1004. (e.g., the wireless line is the first choice if it is available, and the wireline is the second choice if the wireless line is busy.) If the wireless line is chosen, then control flows to step 1208. If the wireline is chosen, then control flows to step 1207. Step 1207 contains a tree (of steps) that are analogous to the wireless choice. If there are multiple wireless devices or wirelines in existence, then the microprocessor 1004 may choose among the several available lines in step 1206. If all of the choices have been exhausted, then the microprocessor 1004 may instruct the busy tone generator 1028 to send a busy signal to the phone appliance 220 until the phone appliance has been returned to on-hook status.

In step 1208, the microprocessor 1004 causes a dial tone to be sent to the phone appliance 220. More specifically, microprocessor 1004 activates dial tone generator 1024, which generates a standard dial tone that is coupled to the phone appliance 220 through various switches in tone generator circuit 1029.

In step 1210, the microprocessor 1004 receives the telephone number/DTMF tones for the outgoing call. More specifically, the DTMF circuit 1030 (in the phone appliance interface 1034) detects the tones for the telephone number, and notifies the microprocessor 1004. Once the DTMF tones are initially detected, the dial tone generated in step 1208 is terminated.

In step 1212, the microprocessor 1004 determines if the wireless device 224 is available for use. If yes, the control flows to step 1214. If the chosen wireless device is not available, but the wireline service is active or there are multiple possible wireless devices, then control returns to step 1204. If there are no other choices, then in step 1213, a busy signal is sent to the phone appliance until an on-hook condition is detected.

In step 1214, the microprocessor 1004 instructs the wireless device 224 to initiate an outgoing call and sends the wireless device the telephone number that was received from the phone appliance 220 in step 1210.

In step 1216, the microprocessor 1004 connects the phone appliance 220 to the wireless device 224. If necessary, the microprocessor 1004 switches the switch module 1060 so that the wireless interface 1002 is coupled to the phone appliance interface 1034. As indicated in FIG. 12, steps 1214 and 1216 can occur in reverse order.

In step 1218, the microprocessor 1004 determines if the call has been accepted by the wireless service by monitoring the control signals from the wireless device 224. If yes, then control flows to step 1220. If the call has not been accepted by the wireless service, then control flows back to step 1204 so that another option can be explored.

In step 1220, the microprocessor 1004 periodically monitors the call to determine when the call has been completed. To do so, the microprocessor 1004 monitors the wireless device 224 to determine if it is still active. Also, the microprocessor 1004 receives any on-hook signals that indicate the phone appliance 220 has been hung-up. Once the call is complete, then control flows to step 1222.

In step 1222, the microprocessor 1004 terminates the wireless connection in order to minimize air-time on the wireless network. This step is not necessary if the call was terminated on the wireless end and the wireless device internally is equipped to go to an inactive state.

The steps in flowcharts 1100 and 1200 that are performed by the microprocessor 1004 may be embodied as computer program logic (also called computer program code) in embodiments of the invention. The computer program logic, when executed, enables the microprocessor 1004 to perform the relevant features of the invention described in the flowchart steps. Such computer program logic may be embodied on a computer useable medium. Examples of computer usable media include a floppy disk, a hard disk, an optical disk, a magnetic tape, memory chips (including RAM and ROM), etc. Alternatively, the microprocessor 1004 may be replaced by an equivalent state machine having logic that performs the features of the invention described in flowcharts 1100 and 1200, as will be understood by those skilled in the relevant arts.

Conclusion

Example implementations of the systems and components of the invention have been described herein. As noted elsewhere, these example implementations have been described for illustrative purposes only, and are not limiting. Other implementation embodiments are possible and covered by the invention, such as but not limited to software and software/hardware implementations of the systems and components of the invention. Such implementation embodiments will be apparent to persons skilled in the relevant art(s) based on the teachings contained herein.

While various application embodiments of the present invention have been described above, it should be understood that they have been presented by way of example only, and not limitation. Thus, the breadth and scope of the present invention should not be limited by any of the above-described exemplary embodiments.

What is claimed is:

1. A wireless communication apparatus, comprising:
 a wireless interface configured to be coupled to a mobile wireless device;
 a modem; and
 a protocol converter, coupled between the wireless interface and the modem and configured to convert a signal from the modem into at least one of a transmit signal that is compatible with the wireless interface and a receive signal that is compatible with the wireless interface, wherein the transmit and receive signals are compatible with a mobile wireless communications system, and wherein the protocol converter further comprises:
 a buffer amplifier coupled to both the wireless interface and a pull-up resistor configured to shift a voltage level of the transmit signal.

2. The wireless communication apparatus of claim 1, wherein the protocol converter is configured to convert a dual-tone multi-frequency signal from the modem into at least one of the transmit signal and the receive signal.

3. The wireless communication apparatus of claim 1, further comprising a dual-tone multi-frequency detection circuit coupled to the protocol converter.

4. The wireless communication apparatus of claim 1, further comprising a wireless device battery charger, coupled to the wireless interface.

5. The wireless communication apparatus of claim 1, further comprising a busy tone generator coupled to the modem.

6. The wireless communication apparatus of claim 1, further comprising an on-hook detector coupled to the modem.

7. The wireless communication apparatus of claim 1, further comprising a dial tone generator coupled to the modem.

8. The wireless communication apparatus of claim 1, further comprising an audio hybrid equivalent circuit coupled between the wireless interface and the modem and configured to convert a tip and ring signal from the modem into the transmit and receive signals that are compatible with the wireless interface.

* * * * *